(12) United States Patent
Minger et al.

(10) Patent No.: US 10,060,564 B2
(45) Date of Patent: Aug. 28, 2018

(54) QUICK CONNECT TORQUE COUPLING WITH SAFETY LOCK

(71) Applicant: KADANT JOHNSON INC., Three Rivers, MI (US)

(72) Inventors: Chad Minger, Three Rivers, MI (US); Matthew Beach, Kalamazoo, MI (US)

(73) Assignee: Kadant Johnson LLC, Three Rivers, MI (US)

( * ) Notice: Subject to any disclaimer, the term of this patent is extended or adjusted under 35 U.S.C. 154(b) by 678 days.

(21) Appl. No.: 14/499,432

(22) Filed: Sep. 29, 2014

(65) Prior Publication Data

US 2015/0276109 A1    Oct. 1, 2015

Related U.S. Application Data

(60) Provisional application No. 61/973,412, filed on Apr. 1, 2014.

(51) Int. Cl.
*F16L 37/23* (2006.01)
*F16L 37/107* (2006.01)

(52) U.S. Cl.
CPC ............. *F16L 37/23* (2013.01); *F16L 37/107* (2013.01)

(58) Field of Classification Search
CPC .......... F16L 37/22; F16L 37/107; F16L 37/23
See application file for complete search history.

(56) References Cited

U.S. PATENT DOCUMENTS

| 2,935,338 | A | * | 5/1960 | Mills, Jr. | F16L 37/23 251/149.5 |
| 3,413,018 | A | * | 11/1968 | Francis | F16L 37/23 285/86 |
| 3,606,394 | A | | 9/1971 | Maurer et al. | |
| 4,070,003 | A | * | 1/1978 | Shames | F16L 37/22 251/149.6 |
| 4,275,907 | A | | 6/1981 | Hunt | |
| 5,029,904 | A | | 7/1991 | Hunt | |

(Continued)

FOREIGN PATENT DOCUMENTS

| EP | 2669564 A2 * | 12/2013 | .......... F16L 37/0982 |
| GB | 991383 A * | 5/1965 | ............ F16L 37/107 |

*Primary Examiner* — David Bochna
*Assistant Examiner* — James A Linford
(74) *Attorney, Agent, or Firm* — Young Basile Hanlon & MacFarlane, P.C.

(57) ABSTRACT

A quick connect apparatus that can accommodate rotational torque and includes a male coupling member, a female coupling member, and a locking collar. The male coupling member has an engaging element, a detent groove on an outer surface, and a tubular configuration that allows fluids to pass through. The female coupling member has an engaging element that is complementary to the engaging element of the male coupling member, at least one detent ball, and a tubular configuration that allows fluids to pass through. The locking collar surrounds an outer surface of the female coupling member and can engage the detent ball of the female coupling member. The engaging element of the male coupling member engages the engaging element of the female coupling member to prevent the male coupling member from rotating relative to the female coupling member when pressure is present within the male coupling member and female coupling member.

13 Claims, 8 Drawing Sheets

(56) References Cited

U.S. PATENT DOCUMENTS

| | | |
|---|---|---|
| 5,114,250 A | 5/1992 | Usui |
| 5,324,082 A | 6/1994 | McNaughton et al. |
| 5,429,395 A | 7/1995 | Ketcham |
| 5,662,359 A | 9/1997 | Kargula |
| 5,971,019 A * | 10/1999 | Imai .................. F16L 37/23 137/614.04 |
| 6,089,619 A | 7/2000 | Goda |
| 7,108,293 B2 | 9/2006 | Van Der Meijden et al. |
| 7,566,077 B2 | 7/2009 | Tsurumi |
| 8,528,942 B2 | 9/2013 | Giordano |
| 8,602,457 B2 | 12/2013 | Boraas et al. |
| 2013/0200607 A1 | 8/2013 | Rodenberg et al. |

* cited by examiner

QUICK CONNECT TORQUE COUPLING WITH SAFETY LOCK

CROSS-REFERENCE TO RELATED APPLICATIONS

This application claims benefit of U.S. Provisional Application Ser. No. 61/973,412, filed on Apr. 1, 2014, which is incorporated herein in its entirety by reference.

TECHNICAL FIELD

The present invention relates to quick connect apparatuses, and more particularly, quick connect apparatuses that can accommodate rotational torque.

BACKGROUND

Quick connect couplings provide a means to connect and disconnect tubular elements without the need of a wrench or similar device. Quick connect couplings are widely used in a wide variety of applications. However, standard quick connect couplings do not support rotational torque, which limits their ability to be used with rotary joints. While current quick connect couplings can be modified to accommodate torque, there are internal safety valves within most quick connect couplings that pose problems. The internal safety valves are susceptible to leaks when contaminants prevent the internal safety valve from closing. Additionally, the internal safety valves within the current quick connect couplings increase the coupling's size, reduce the flow capacity, and the pressure the coupling can withstand. As a result, the current quick connect couplings cannot not be modified to accommodate torque and withstand high internal pressure in a small size.

SUMMARY

Quick connect apparatuses that can accommodate rotational torque are disclosed herein. A quick connect apparatus includes a male coupling member, a female coupling member, and a locking collar. The male coupling member has an engaging element, a detent groove on an outer surface, and a tubular configuration that allows fluids to pass through the male coupling member. The female coupling member can house the male coupling member. The female coupling member has an engaging element that is complementary to the engaging element of the male coupling member, at least one detent ball, and a tubular configuration that allows fluids to pass through the female coupling member. The locking collar surrounds an outer surface of the female coupling member and can engage the detent ball of the female coupling member. The engaging element of the male coupling member engages the engaging element of the female coupling member to prevent the male coupling member from rotating relative to the female coupling member when pressure is present within the male coupling member and female coupling member. The detent ball of the female coupling member engages the detent groove of the male coupling member to prevent the male coupling member from disconnecting from the female coupling member when little or no pressure is present within the male coupling member and the female coupling member. The engaging elements of the male coupling member and the female coupling member may be either a hook having a substantially J-shaped configuration, an integral pin, a complementary slot, a key with substantially rounded ends, or a flexible metal ear.

The quick-connect apparatus may include a stop ring and a spring. The stop ring has a substantially disc-like configuration and surrounds the outer surface of the female coupling member. The spring biases the stop ring and surrounds the outer surface of the female coupling member. The locking collar may have a substantially stepped configuration to provide engagement with the detent balls and clearance for the stop ring and the spring. The male coupling member may have at least one annular grove in the outer surface and a seal ring seated within the annular groove to seal the outer surface of the male coupling member against an inner surface of the female coupling member when the male coupling member is inserted into the female coupling member.

A locking assembly may be provided that prevents the locking collar from rotating relative to the female coupling member while allowing the locking collar to move axially in relation to the female coupling member. The locking assembly may have a locking ball, a recess, and a slot. The locking ball has a substantially spherical configuration. The recess is located in the outer surface of the female coupling member and partially houses the locking ball. The recess has a substantially hemispherical configuration, and the diameter of the recess is substantially the same as the diameter of the locking ball. The slot is located between the locking ball and the female coupling member. The slot partially houses the locking ball, and the length of the slot is larger than the diameter of the locking ball. The male coupling member may have at least one annular groove in the outer surface and a seal ring seated within the annular groove to seal the outer surface of the male coupling member against an inner surface of the female coupling member when the male coupling member is inserted into the female coupling member.

BRIEF DESCRIPTION OF THE DRAWINGS

The various features, advantages, and other uses of the present apparatus will become more apparent by referring to the following detailed description and drawings, in which.

DETAILED DESCRIPTION

Figure 1:
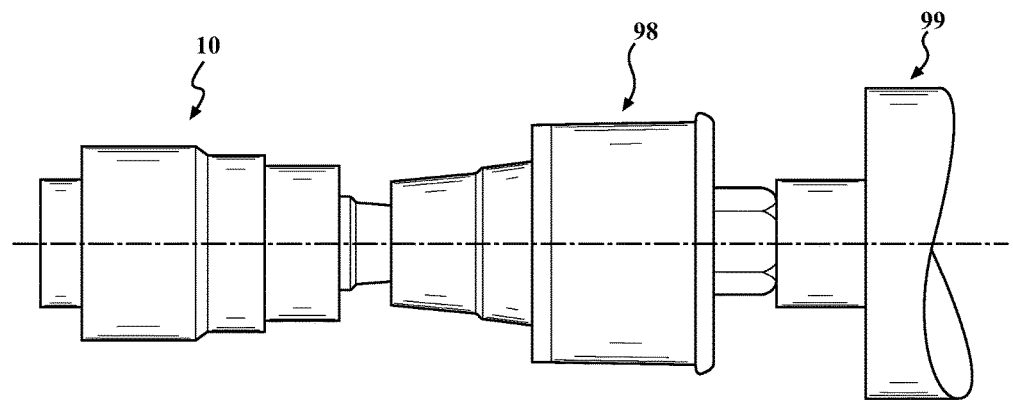
FIG. 1 is a side view of an apparatus attached to a rotary joint that is attached to a rotating device.
Figure 2:
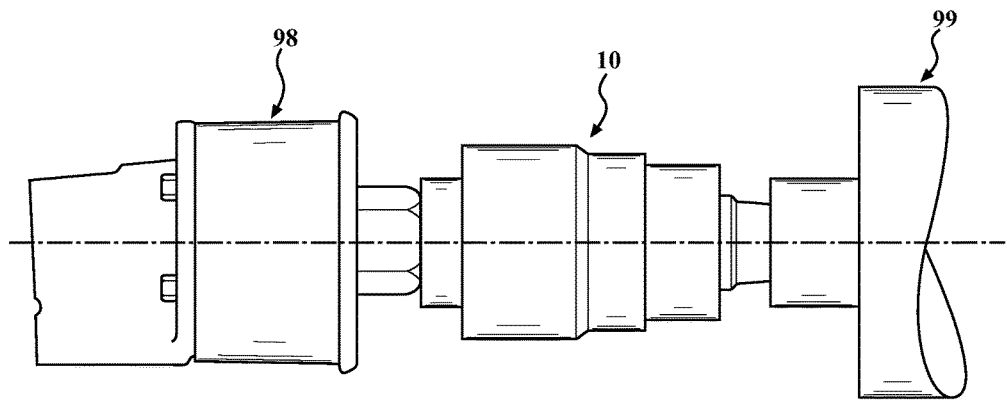
FIG. 2 is a perspective view of the apparatus attached between the rotary joint and the rotating device.

This description is directed to an apparatus 10 that utilizes complementary engaging coupling members to inhibit relative rotation of the coupling members and disengagement of the coupling members when a joint is pressurized, as shown in FIGS. 1-4. The apparatus 10 is designed to transmit torque and will not leak when exposed to vibration. The apparatus 10 may act as a body that other components may be fastened to, such as rotary joints, hoses, transmission lines, parts being fabricated, and the like. The apparatus 10 may be made from any suitable material, such as metal. As shown in FIG. 1, the apparatus 10 may be attached to a rotary joint 98, and the rotary joint 98 is attached to a rotating device 99. In this configuration, the apparatus 10 and the housing of the rotary joint 98 will remain stationary, and the rotor of the rotary joint 98 will rotate with the rotating device 99. When the apparatus 10 is disconnected, a male coupling member 30 will remain attached to the rotary joint 98. If the apparatus 10 is attached between the rotary joint 98 and the rotating device 99, as shown in FIG. 2, the rotating device 99 and the rotor of the rotary joint 98 will rotate with the apparatus 10, and the housing of the rotary joint 98 will remain stationary. When the apparatus 10 is disconnected while in this configuration, the male coupling member 30 will remain attached to the rotating device 99, and a female coupling member 20 will remain attached to the rotary joint 98.

Figure 3:
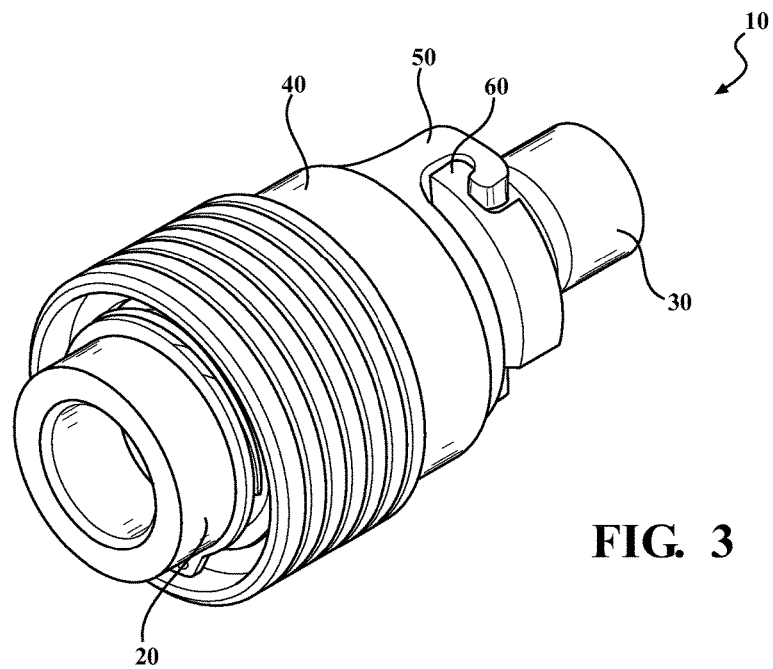
FIG. 3 is a side view of the apparatus in an engaged position.
Figure 4:
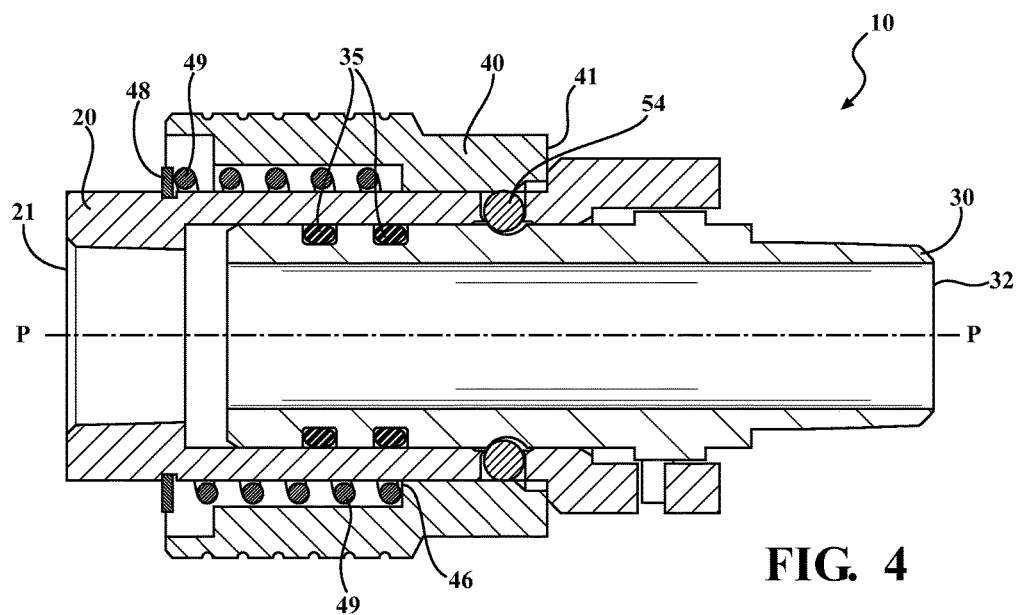
FIG. 4 is a cross-sectional view of the apparatus in the engaged position.

The apparatus 10 includes the female coupling member 20, the male coupling member 30, and a locking collar 40, as shown in FIGS. 3-4. The female coupling member 20 is slightly larger diametrically than the male coupling member 30, such that the female coupling member 20 can house the male coupling member 30 when the male coupling member 30 is inserted into the female coupling member 20. The locking collar 40 surrounds the outside of the female coupling member 20 to provide a housing for a stop ring 48 and a spring 49. The stop ring 48 has a substantially disc-like configuration and surrounds the female coupling member 20 near a first end 21 of the female coupling member 20. The spring 49 may be a compression spring that is adjacent to the stop ring 48 and biases the locking collar 40 away from the stop ring 48. Thus, the locking collar 40 is moved toward the stop ring 48 by application of an external force and returns to its original position when the external force is removed.

Figure 5:
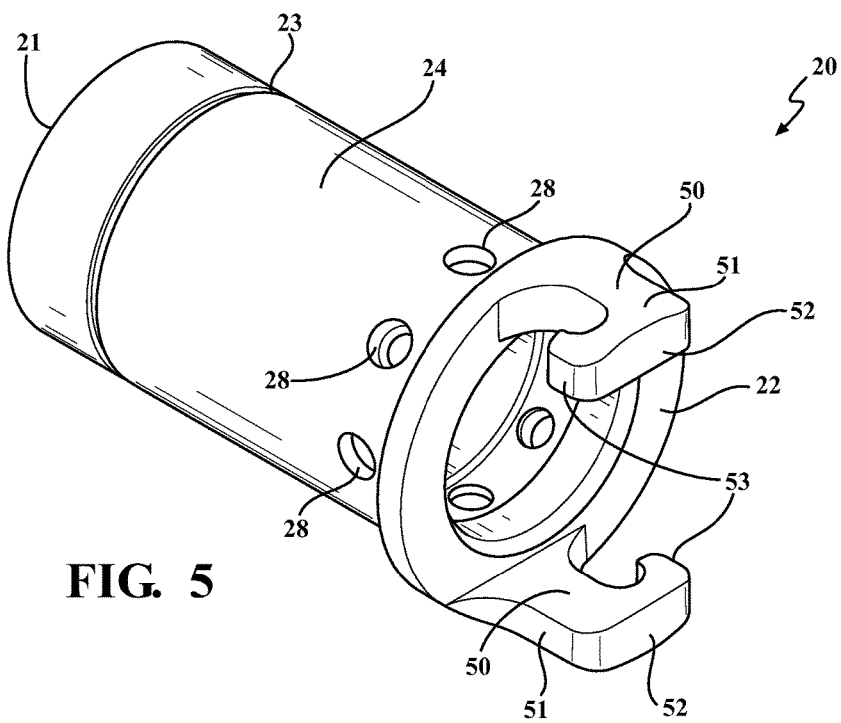
FIG. 5 is a perspective view of a female coupling member of the apparatus.
Figure 6:
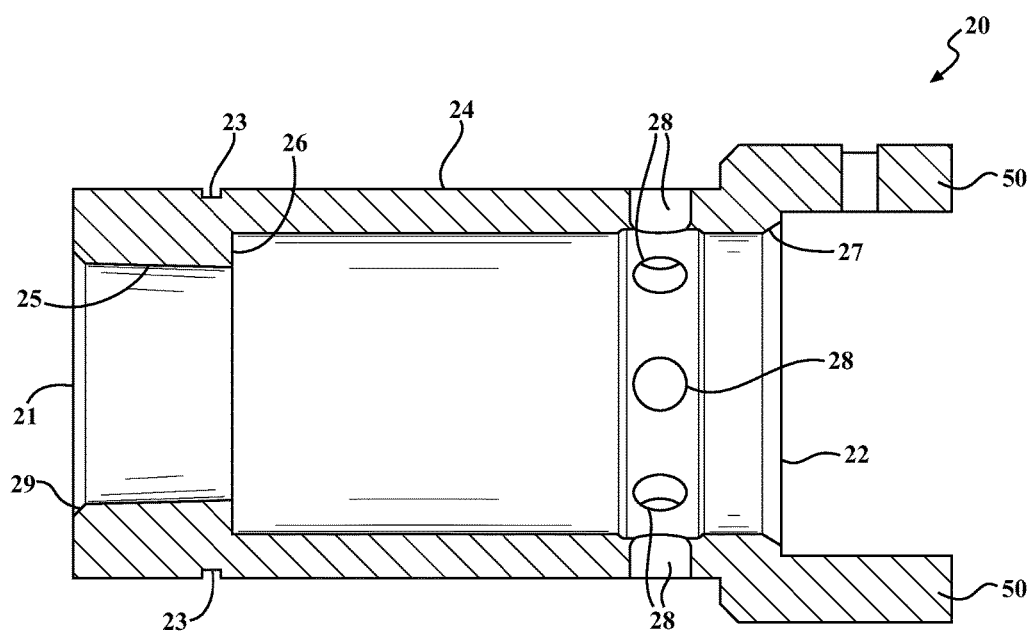
FIG. 6 is a cross-sectional view of the female coupling member of the apparatus.
Figure 7:
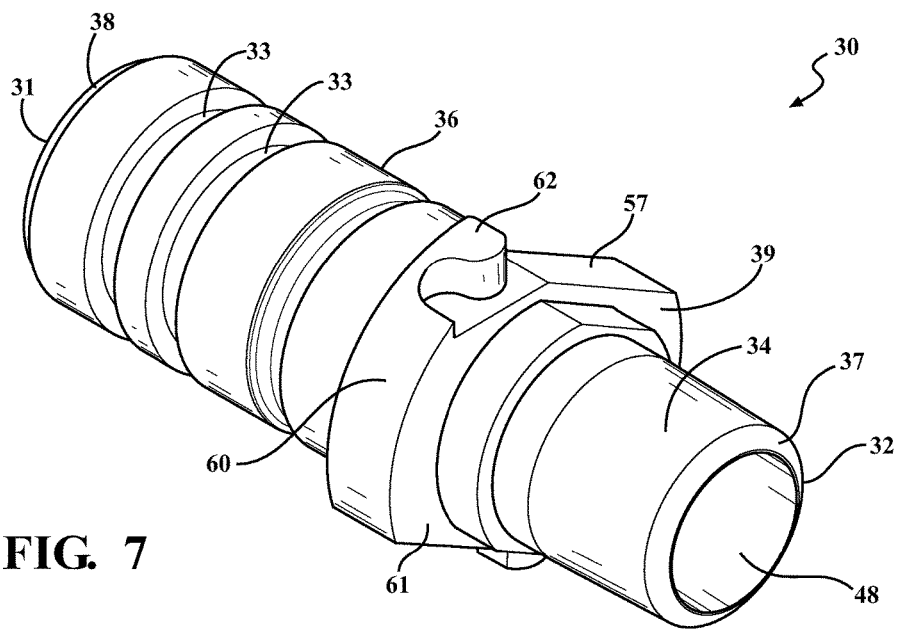
FIG. 7 is a perspective view of a male coupling member of the apparatus.
Figure 8:
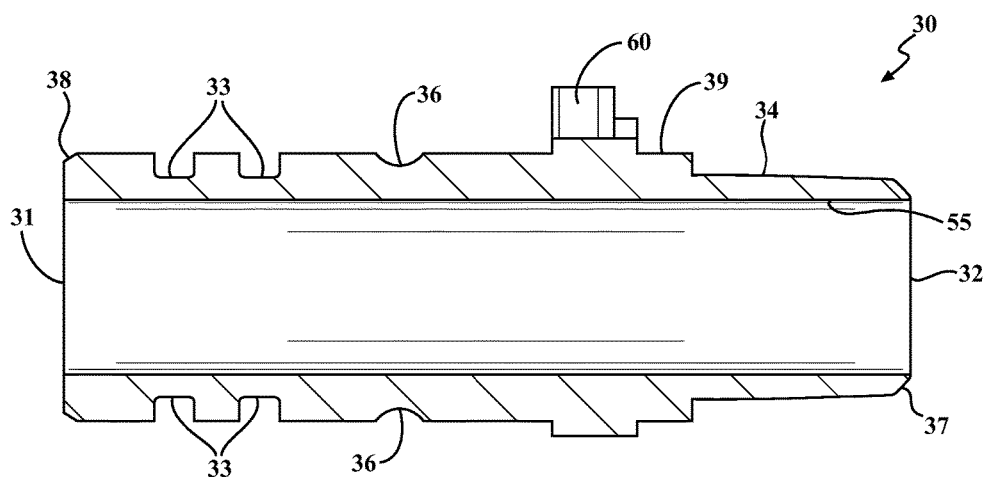
FIG. 8 is a cross-sectional view of the male coupling member of the apparatus.
Figure 9:
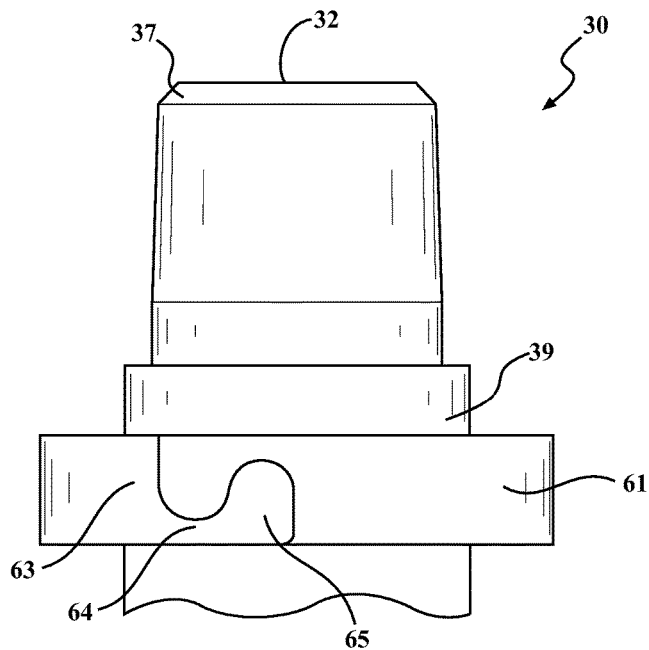
FIG. 9 is a detail view of a complementary engaging member of the male coupling member of the apparatus.
Figure 10:
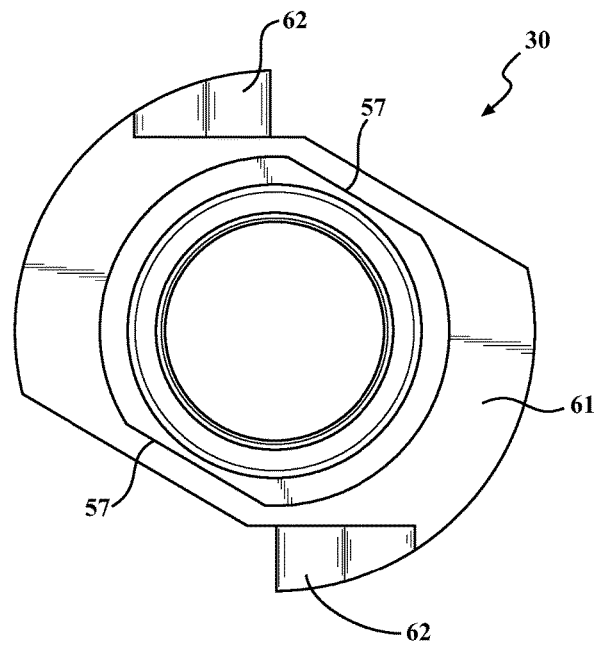
FIG. 10 is an end view of the male coupling member of the apparatus.

The female coupling member 20 is a substantially tubular element that fluids can pass freely through. The female coupling member 20 has a second end 22 that is spaced longitudinally from the first end 21, as illustrated in FIGS. 5-6. The first end 21 and the second end 22 of the female coupling member 20 may each have a chamfer 27, 29 formed on an inner surface 25. An annular groove 23 may be formed in an outer surface 24 of the female coupling member 20 near the first end 21. The stop ring 48 may be seated within the annular groove 23 to fix the position of the stop ring 48 with respect to the female coupling member 20. The first end 21 of the female coupling member 20 can be configured so that the female coupling member 20 can be attached to a component, such as a rotary joint 98 (shown in FIG. 2). For example, the inner surface 25 of the female coupling member 20 could be threaded adjacent to the first end 21.

The inner surface 25 of the female coupling member 20 extends from the first end 21 to the second end 22 and is spaced a radial distance from the outer surface 24. Because the radial thickness of the female coupling member 20 may have a stepped configuration, an annular shoulder 26 may be formed near the first end 21 such that the inside diameter of the female coupling member 20 is smaller at the first end 21 than it is at the second end 22. A first end 31 of the male coupling member 30 may abut the annular shoulder 26 when the male coupling member 30 is inserted into the female coupling member 20. This limits the maximum depth of insertion of the male coupling member 30 with respect to the female coupling member 20.

To secure the male coupling member 30 to the female coupling member 20 when no pressure is present within the apparatus 10, at least one aperture 28 may extend through the female coupling member 20 near the second end 22. Each aperture 28 may house a detent ball 54 (shown in FIG. 4) such that the detent balls 54 are able to partially extend into the interior of the female coupling member 20. The apertures 28 are narrowed adjacent to the inner surface 25 to prevent the detent balls 54 from passing into the interior of the female coupling member 20. Although eight apertures 28 are illustrated, it is anticipated that the number of apertures could be increased or decreased.

To restrain the male coupling member 30 from rotating relative to the female coupling member 20, the female coupling member 20 has at least one engaging element 50. The engaging element 50 of the female coupling member 20 may protrude both perpendicularly and parallel from the second end 22 of the female coupling member 20. As shown, there are two engaging elements 50 and each is a hook having a substantially J-shaped configuration with a long leg 51, a middle leg 52, and a short leg 53. The long leg 51 of the hook extends substantially perpendicular from the second end 22 of the female coupling member 20. The middle leg 52 of the hook is substantially parallel to the second end 22 of the female coupling member 20. Various modifications of the engaging elements 50 of the female coupling member 20 are anticipated. Possible modifications of the engaging element 50 include, but are not limited to, using an integral pin, a key with rounded ends, a flexible metal ear, or complementary slots.

Similar to the female coupling member 20, the male coupling member 30 is a generally tubular element that fluid can pass freely through, as shown in FIGS. 7-10. The male coupling member 30 has a second end 32 that is spaced longitudinally from the first end 31. The first end 31 and the second end 32 of the male coupling member 30 may each have a chamfer 37, 38 formed on an outer surface 34 of the male coupling member 30. The second end 32 of the male coupling member 30 can be configured so that the male coupling member 30 can be attached to a component, such as a rotary joint 98 (shown in FIG. 1) or a rotating device (shown in FIG. 2). For example, the outer surface 34 of the male coupling member 30 could be threaded adjacent to the second end 32 of the male coupling member 30, or alternatively, an inner surface 55 of the male coupling member 30 could be threaded adjacent to the second end 32 of the male coupling member 30. The male coupling member 30 may have a protruding disc 39 with a pair of wrench flats 57 near the second end 32 of the male coupling member 30 to assist with attaching the male coupling member 30 to the component.

On the outer surface 34 of the male coupling member 30 near the first end 31, at least one annular groove 33 having a substantially rectangular cross-sectional configuration may be integrally formed. Although two annular grooves 33 are illustrated, the number of annular grooves 33 could be increased or decreased. Each annular groove 33 may house a seal ring 35 (shown in FIG. 4) to seal against the inner surface 25 of the female coupling member 20. The seal rings 35 may have a substantially circular cross-sectional configuration and can be, for example, O-rings made of an elastomeric material. Alternatively, the annular grooves 33 could be located in the inner surface 25 of the female coupling member 20 and house seal rings 35 that seal against the outer surface 34 of the male coupling member 30.

To restrain the male coupling member 30 to the female coupling member 20 when no pressure is present within the apparatus 10, a detent groove 36 having a substantially arcuate cross-sectional configuration may be integrally formed in the outer surface 34 of the male coupling member 30. The detent balls 54 of the female coupling member 20 may be seated in the detent groove 36 when the male coupling member 30 is inserted into the female coupling member 20.

To restrain the male coupling member 30 from rotating relative to the female coupling member 20, the male coupling member 30 has at least one engaging element 60 that is complementary to the engaging element 50 on the female coupling member 20. When pressure is present within the apparatus 10, the female coupling member 20 is urged away from the male coupling member 30. This urging forces the engaging elements 50, 60 into continued engagement and locks the male coupling member 30 to the female coupling member 20 to prevent the male coupling member 30 from disengaging the female coupling member 20 unless a force is axially applied that is equal or greater than the force that results from the pressure within the apparatus 10. As illustrated, the engaging element 60 on the male coupling member 30 is a protruding disc 61 having a generally ovoid configuration with two integrally formed J-shaped hooks 62. Each J-shaped hook 62 has a long leg 63, a middle leg 64, and a short leg 65. The long leg 63 of each hook 62 is substantially perpendicular to the second end 32 of the male coupling member 30, and the middle leg 64 of each hook 62 is substantially parallel to the second end 32 of the male coupling member 30. Various modifications of the engaging element 60 of the male coupling member 30 are anticipated. Possible modifications of the engaging element 60 include, but are not limited to, using an integral pin, a key with rounded ends, a flexible metal ear, or complementary slots.

Figure 11:
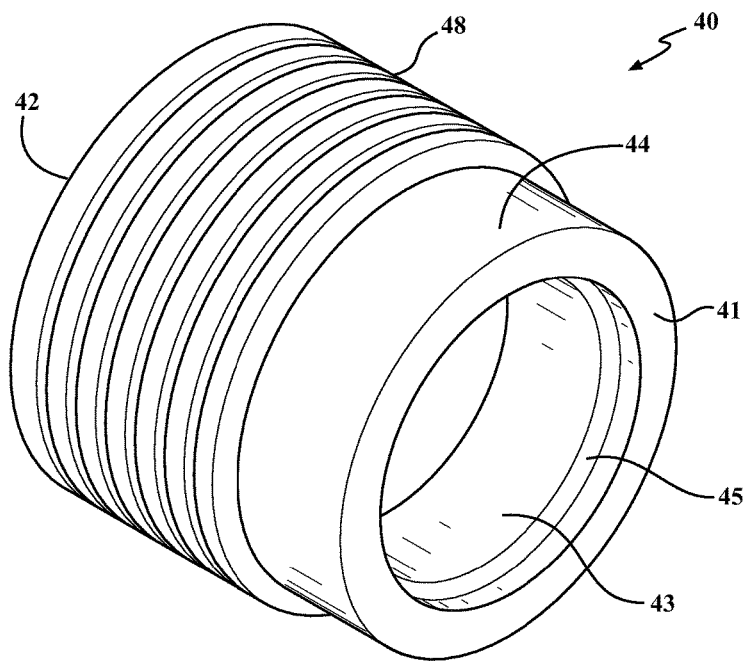
FIG. 11 is a perspective view of a locking collar of the apparatus.
Figure 12:
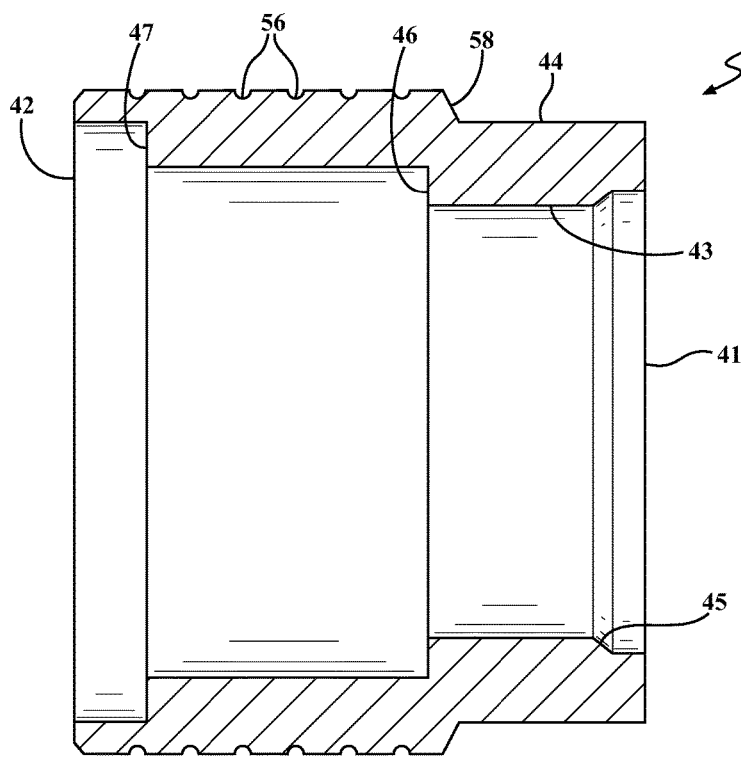
FIG. 12 is a cross-sectional view of the locking collar of the apparatus.

The locking collar 40 is a substantially tubular element that surrounds the outer surface 24 of the female coupling member 20 to retain the detent balls 54 within the apertures 28 of the female coupling member 20. As shown in FIGS. 11-12, the locking collar 40 has a first end 41 and a second end 42 that is spaced longitudinally from the first end 41. The locking collar 40 also has an inner surface 43 and an outer surface 44 that is spaced in a radial direction from the inner surface 43. A chamfer 58 may be formed in the outer surface 44 of the locking collar 40 approximately half way between the first end 41 and the second end 42 of the locking collar 40. A plurality of annular grooves 56 having an arcuate cross-sectional configuration may be integrally formed in the outer surface 44 of the locking collar 40 near the second end 42 to assist with moving the locking collar 40 toward the stop ring 48.

The inner surface 43 of the locking collar 40 has a stepped configuration between the first end 41 and the second end 42 with the inner diameter being the largest at the second end 42 to provide clearance for the stop ring 48 that surrounds the female coupling member 20. A first annular shoulder 47 may be formed in the inner surface 43 of the locking collar 40 where the inner diameter of the locking collar 40 narrows to provide clearance for the spring 49 that surrounds the female coupling member 20. A second annular shoulder 46 may be formed in the inner surface 43 of the locking collar 40 where the inner diameter of the locking collar 40 narrows to engage the outer surface 24 and the detent balls 54 of the female coupling member 20. A chamfer 45 may be formed in the inner surface 43 of the locking collar 40 near the first end 41 where the inner diameter of the locking collar 40 increases to allow the detent balls 54 of the female coupling member 20 to release from the detent groove 36 of the male coupling member 30 when the locking collar 40 is moved axially toward the first end 21 of the female coupling member 20.

To connect the female coupling member 20 to the male coupling member 30, the locking collar 40 is moved toward the first end 21 of the female coupling member 20 until the first end 41 of the locking collar 40 passes over the apertures 28. This provides a space between the female coupling member 20 and the locking collar 40 to allow the detent balls 54 to move outward toward the locking collar 40. The locking collar 40 remains in this position while the first end 31 of the male coupling member 30 is inserted coaxially into the second end 22 of the female coupling member 20. The male coupling member 30 is inserted until the short leg 65 of the engaging element 60 moves axially past the short leg 65 of the engaging element 50. The male coupling member 30 is then rotated circumferentially so that the short leg 65 of the engaging element 60 passes by the short leg 53 of the engaging element 50. The male coupling member 30 is then moved away from the female coupling member 20 until the short leg 65 of the engaging element 60 engages the middle leg 52 of the engaging element 50 and the short leg 53 of the engaging element 50 engages the middle leg 64 of the engaging element 60. The locking collar 40 is released, so that the first end 41 of the locking collar 40 moves toward the engaging element 50 on the female coupling member 20 and passes over the apertures 28, thereby seating the detent balls 54 in the detent groove 36 to restrain the male coupling member 30 from moving axially with respect to the female coupling member 20.

When the male coupling member 30 is inserted into the female coupling member 20, a passageway P (shown in FIG. 4) runs axially through the female coupling member 20 and the male coupling member 30. The seal rings 35 engage the female coupling member 20 and the male coupling member 30 to define a substantially fluid-tight seal between the inner surface 25 of the female coupling member 20 and the outer surface 34 of the male coupling member 30. The detent balls 54 in the apertures 28 of the female coupling member 20 engage the detent groove 36 of the male coupling member 30 to prevent the male coupling member 30 from disconnecting from the female coupling member 20. When there is pressure within the passageway P, for example steam pressure, the male coupling member 30 is urged away from the female coupling member 20. This urging forces the engaging elements 50, 60 into continued engagement and locks the male coupling member 30 to the female coupling member 20 to prevent the male coupling member 30 from disengaging the female coupling member 20 even if the detent balls 54 are disengaged from the detent groove 36.

To disconnect the male coupling member 30 from the female coupling member 20, the locking collar 40 must be moved toward the first end 21 of the female coupling member 20 until the first end 41 of the locking collar 40 passes over the apertures 28 to release the detent balls 54 from the detent groove 36. The locking collar 40 remains in this position while the female coupling member 20 is pushed axially toward the second end 32 of the male coupling member 30 so that the engaging element 50 of the female coupling member 20 disengages the engaging element 60 of the male coupling member 30. This disengagement can only occur when there is no pressure present within the passageway P or a pressure greater than what exists within the passageway P is axially applied in the opposite direction to the female coupling member 20. The female coupling member 20 is then rotated circumferentially and pushed axially away from the male coupling member 30 so that the first end 41 of the locking collar 40 passes over the apertures 28 of the female coupling member 20. The male coupling member 30 can then be removed from the female coupling member 20 and the locking collar 40 released, such that the first end 41 of the locking collar 40 moves axially toward the engaging element 50 and passes over the apertures 28 of the female coupling member 20.

Figure 13:
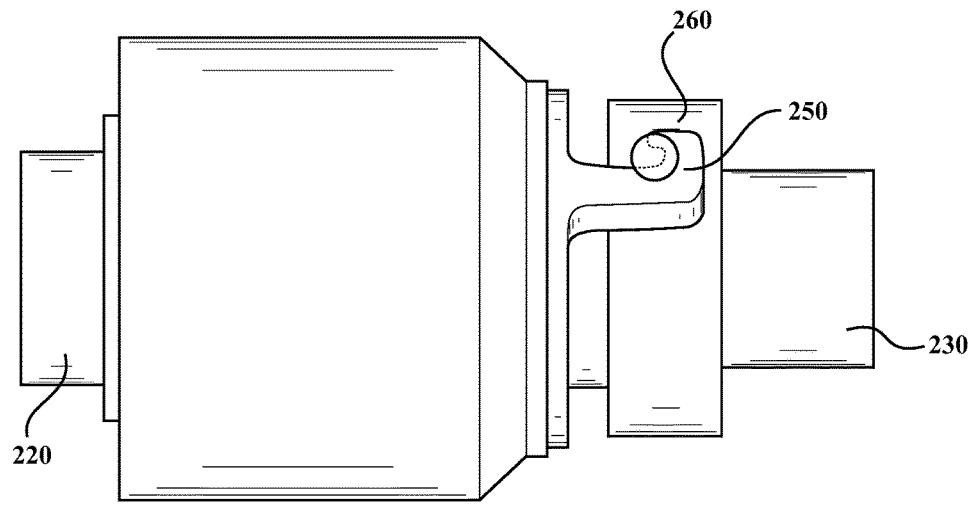
FIG. 13 is a side view of the apparatus in a first alternative embodiment with the male coupling member having an integral pin.
Figure 14:
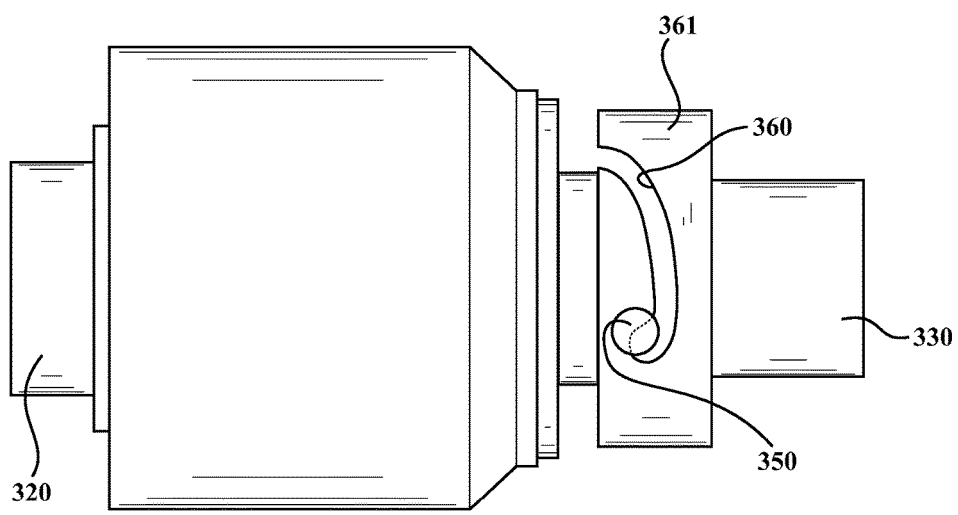
FIG. 14 is a side view of the apparatus in a second alternative embodiment with the female coupling member having an integral pin and the male coupling member having a complementary slot.

In alternative embodiments, the engaging elements 50, 60 of the female coupling member 20 and the male coupling member 30 can be modified without affecting the other structural and operational aspects of the apparatus 10. As illustrated in FIG. 13, an engaging element 260 of a male coupling member 230 may be an integral pin. The integral pin may engage an engaging element 250 of a female coupling member 220, such as a hook, that has a J-shaped configuration. FIG. 14 shows another alternative embodiment that also has an integral pin as an engaging element 360 of a male coupling member 330. In this embodiment, an engaging element 350 of a female coupling member 320 is a complementary slot in a protruding disc 361. The integral pin engages the complementary slot to secure the male coupling member 330 to the female coupling member 320 when the male coupling member 330 is inserted into the female coupling member 320.

Figure 15:
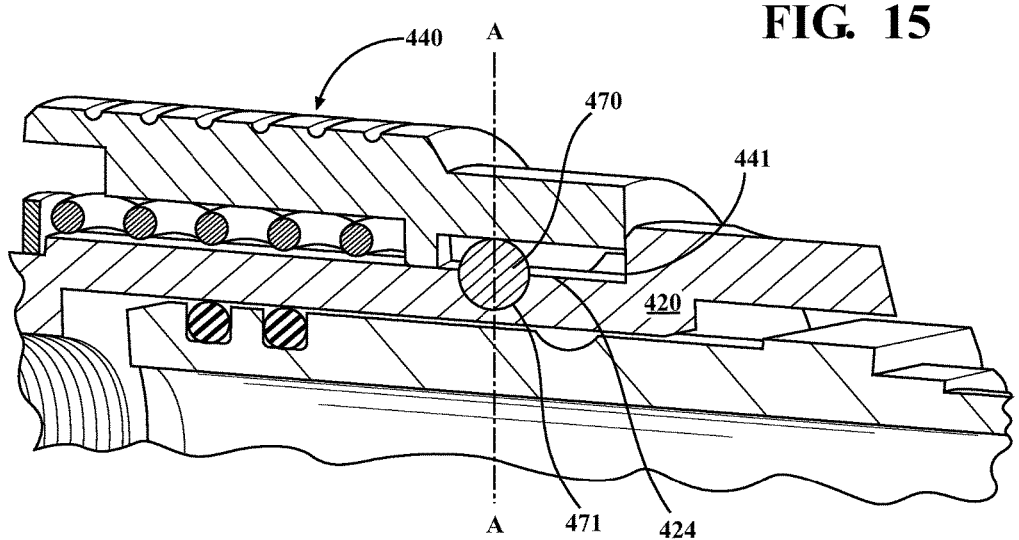
FIG. 15 is a perspective, cross-sectional view of the apparatus in a third alternative embodiment with a locking assembly.
Figure 16:
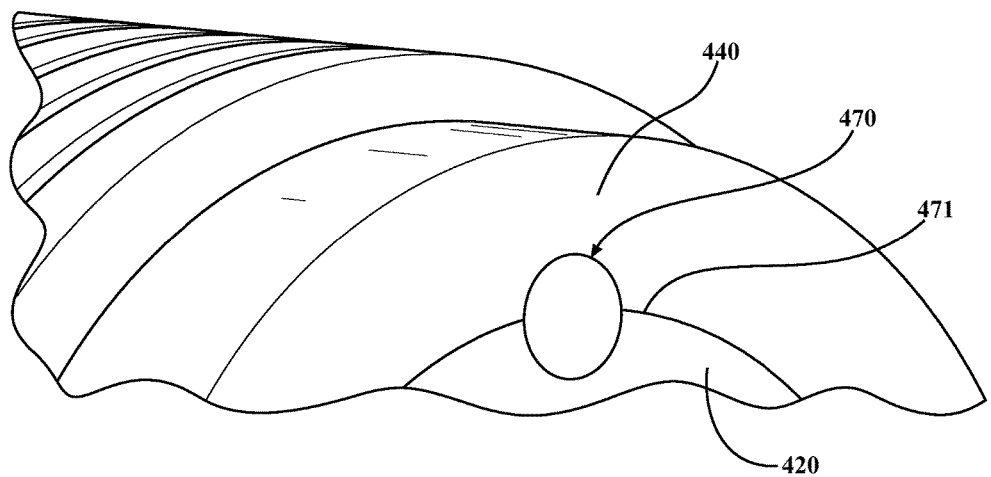
FIG. 16 is perspective, cross-sectional view along line A-A of FIG. 15 of the apparatus in the third alternative embodiment.

In another alternative embodiment, a locking assembly may be included to restrain the locking collar 40 from rotating relative to the female coupling member 20. As illustrated in FIGS. 15-16, the locking assembly includes a locking ball 470, a recess 471, and a slot 472. The locking ball 470 may have a substantially spherical configuration. The recess 471 may have a substantially hemisphere configuration and be provided in an outer surface 424 of a female coupling member 420 to partially house the locking ball 470. The slot 472 is located between the female coupling member 420 and a locking collar 440. The width of the slot 472 is slightly larger than the diameter of the locking ball 470, which prevents the locking collar 440 from rotating relative to the female coupling member 420. The length of the slot 472 is significantly larger than the diameter of the locking ball 470 to allow the locking collar 440 to move axially in relation to the female coupling member 420 while the locking ball 470 is disposed within the slot 472. Various embodiments and implementations of the locking assembly are anticipated. For example, the locking assembly could comprise fixing the locking collar 440 to the female coupling member 420 or using a floating key.

While the invention has been described in connection with what is presently considered to be the most practical and preferred implementation, it is to be understood that the invention is not limited to the disclosed implements but, on the contrary, is intended to cover various modifications and equivalent arrangements included within the spirit and scope of the appended claims. The scope of the appended claims is to be accorded the broadest interpretation so as to encompass all such modifications and equivalent structures as permitted under the law.

What is claimed is:

1. A quick-connect apparatus that can accommodate rotational torque, comprising:
    a male coupling member having an engaging element including a hook defining a recess extending in a first direction, a detent groove on an outer surface, and a tubular configuration that allows fluids to pass therethrough;
    a female coupling member for housing the male coupling member, the female coupling member having an engaging element including a hook defining a recess extending in a second direction opposite the first direction, the first and second directions being generally parallel in relation to a longitudinal axis defined by the quick-connect apparatus, a detent ball, and a tubular configuration that allows fluids to pass therethrough, the engaging element of the female coupling member being complementary to the engaging element of the male coupling member; and
    a locking collar surrounding an outer surface of the female coupling member that can engage the detent ball of the female coupling member,
    wherein the engaging element of the male coupling member and the engaging element of the female coupling member are configured and dimensioned to restrain relative rotation between the male coupling member and the female coupling member after engagement, pressure within the male coupling member and the female coupling member urging the engaging element of the male coupling member into continued engagement with the engaging element of the female coupling member to prevent the male coupling member from disconnecting from the female coupling member.

2. The quick-connect apparatus of claim 1, the female coupling member further comprising:
    a stop ring having a substantially disc-like configuration and surrounding the outer surface of the female coupling member; and
    a spring that biases the stop ring and surrounds the outer surface of the female coupling member.

3. The quick-connect apparatus of claim 2, wherein the locking collar has a substantially stepped configuration to provide engagement with the detent ball and clearance for the stop ring and the spring.

4. The quick-connect apparatus of claim 1, further comprising:
    an annular groove in the outer surface of the male coupling member or an inner surface of the female coupling member; and
    a seal ring seated within the annular groove to seal the outer surface of the male coupling member against the inner surface of the female coupling member when the male coupling member is inserted into the female coupling member.

5. The quick-connect apparatus of claim 1, wherein a fluid communication channel is formed through the male coupling member and the female coupling member, pressure within the fluid communication channel urges the male coupling member away from the female coupling member, and the urging of the male coupling member away from the female coupling member forces the engaging element of the male coupling member and the engaging element of the female coupling member into continued engagement.

6. A quick-connect apparatus that can accommodate rotational torque, comprising:
a male coupling member having a hook with a substantially J-shaped configuration defining a recess extending in a first direction, a detent groove on an outer surface, and a tubular configuration that allows fluids to pass therethrough;
a female coupling member for housing the male coupling member, the female coupling member having a hook with a substantially J-shaped configuration defining a recess extending in a second direction opposite the first direction, the first and second directions being generally parallel in relation to a longitudinal axis defined by the quick-connect apparatus, a detent ball, and a tubular configuration that allows fluids to pass therethrough, the hook of the female coupling member being complementary to the hook of the male coupling member; and
a locking collar surrounding an outer surface of the female coupling member that can engage the detent ball of the female coupling member,
wherein the detent ball of the female coupling member engages the detent groove of the male coupling member to removeable secure the male coupling member to the female coupling member, and
wherein the hook of the male coupling member engages the hook of the female coupling member to prevent the male coupling member from disconnecting from the female coupling member until an external force is axially applied to at least one of the female coupling member or the male coupling member that is equal to or greater than an internal force that results from pressure within the female coupling member and the male coupling member, the hook of the male coupling member and the hook of the female coupling member being configured and dimensioned to restrain relative rotation between the male coupling member and the female coupling member after engagement.

7. The quick-connect apparatus of claim 6, the female coupling member further comprising:
a stop ring having a substantially disc-like configuration and surrounding the outer surface of the female coupling member; and
a spring that biases the stop ring and surrounds the outer surface of the female coupling member.

8. The quick-connect apparatus of claim 7, wherein the locking collar has a substantially stepped configuration to provide engagement with the detent ball and clearance for the stop ring and the spring.

9. The quick-connect apparatus of claim 8, further comprising:
an annular groove in the outer surface of the male coupling member or an inner surface of the female coupling member; and
a seal ring seated within the annular groove to seal the outer surface of the male coupling member against the inner surface of the female coupling member when the male coupling member is inserted into the female coupling member.

10. A quick-connect apparatus that can accommodate rotational torque, comprising:
a male coupling member having an engaging element including a recess extending in a first direction, a detent groove on an outer surface, and a tubular configuration that allows fluids to pass therethrough;
a female coupling member for housing the male coupling member, the female coupling member having an engaging element including a recess extending in a second direction opposite the first direction, the first and second directions being generally parallel in relation to a longitudinal axis defined by the quick-connect apparatus, a detent ball, and a tubular configuration that allows fluids to pass therethrough, the engaging element of the female coupling member being complementary to the engaging element of the male coupling member; and
a locking collar surrounding an outer surface of the female coupling member that can engage the detent ball of the female coupling member,
wherein the detent ball of the female coupling member engages the detent groove of the male coupling member to removably secure the male coupling member to the female coupling member, and
wherein the engaging element of the male coupling member and the engaging element of the female coupling member are configured and dimensioned to restrain relative rotation between the male coupling member and the female coupling member after engagement, at least one of the engaging element of the female coupling member or the engaging element of the male coupling member is rotated and moved axially to disengage the engaging element of the male coupling member from the engaging element of the female coupling member.

11. The quick-connect apparatus of claim 10, wherein at least one of the engaging element of the female coupling member or the engaging element of the male coupling member is rotated and moved axially to engage the engaging element of the male coupling member to the engaging element of the female coupling member.

12. The quick-connect apparatus of claim 10, wherein a fluid communication channel is formed through the male coupling member and the female coupling member, pressure within the fluid communication channel urges the male coupling member away from the female coupling member, and the urging of the male coupling member away from the female coupling member forces the engaging element of the male coupling member and the engaging element of the female coupling member into continued engagement.

13. The quick-connect apparatus of claim 12, wherein the urging of the male coupling member away from the female coupling member locks the male coupling member to the female coupling member to prevent the male coupling member from disengaging the female coupling member even if the detent ball of the female coupling member disengages the detent groove of the male coupling member.

* * * * *